US009544186B2

(12) United States Patent
Hallivuori

(10) Patent No.: US 9,544,186 B2
(45) Date of Patent: Jan. 10, 2017

(54) METHOD AND EQUIPMENT FOR CONFIGURING A SOFTWARE-DEFINED NETWORK

(71) Applicant: TELLABS OY, Espoo (FI)

(72) Inventor: Ville Hallivuori, Espoo (FI)

(73) Assignee: CORIANT OY, Espoo (FI)

( * ) Notice: Subject to any disclaimer, the term of this patent is extended or adjusted under 35 U.S.C. 154(b) by 250 days.

(21) Appl. No.: 14/093,730

(22) Filed: Dec. 2, 2013

(65) Prior Publication Data

US 2014/0160984 A1  Jun. 12, 2014

(30) Foreign Application Priority Data

Dec. 7, 2012  (FI) ...................................... 20126275

(51) Int. Cl.
  *H04L 12/24* (2006.01)
  *G06F 9/48* (2006.01)
(52) U.S. Cl.
  CPC ......... *H04L 41/0803* (2013.01); *G06F 9/4843* (2013.01)
(58) Field of Classification Search
  None
  See application file for complete search history.

(56) References Cited

U.S. PATENT DOCUMENTS

| 6,651,102 | B2 | 11/2003 | Baker et al. |
| 2009/0138577 | A1 | 5/2009 | Casado et al. |
| 2011/0310894 | A1 | 12/2011 | Karino |
| 2012/0147898 | A1 | 6/2012 | Koponen et al. |
| 2013/0163475 | A1* | 6/2013 | Beliveau ............... H04L 67/327 370/257 |

(Continued)

FOREIGN PATENT DOCUMENTS

| EP | 2408155 | 1/2012 |
| WO | 2004092969 | 10/2004 |
| WO | 2012032864 | 3/2012 |

OTHER PUBLICATIONS

Finnish Search Report dated Oct. 4, 2013, corresponding to the Foreign Priority Application No. 20126275.

(Continued)

*Primary Examiner* — Mohammad Adhami
(74) *Attorney, Agent, or Firm* — Young & Thompson

(57) ABSTRACT

A method for configuring a network element of a software-defined network "SDN" is presented. The network element maintains at least one look-up table defining actions to be executed in conjunction with managing a first data frame. The method comprises i) receiving (301) second data frames from a controller of the software-defined network, ii) reading (302), from the second data frames, a configuration program comprising one or more computer executable instructions defining at least one action to be executed in conjunction with managing the first data frame, and iii) associating (303) the configuration program to the at least one look-up table so that the configuration program is callable to be executed in conjunction with managing the first data frame with the aid of the at least one look-up table. The use of the configuration program instead of mere configuration parameters increases the freedom to implement different functionalities in the network element.

20 Claims, 3 Drawing Sheets

(56) References Cited

U.S. PATENT DOCUMENTS

| | | | |
|---|---|---|---|
| 2014/0211795 A1* | 7/2014 | Chiba | H04L 49/25 370/389 |
| 2014/0286294 A1* | 9/2014 | Akiyoshi | H04W 48/18 370/329 |
| 2014/0307742 A1* | 10/2014 | Koide | H04L 49/15 370/400 |

OTHER PUBLICATIONS

European Search Report dated Jul. 14, 2016, corresponding to the Foreign Priority Application No. 13 19 5065.
Christopher Monsanto et al: "A compiler and run-time system for network programming languages", PLDI09 : Proceedings of the 2009 ACM SIGPLAN Conference on Programming Language Design and Implementation ; Jun. 15-20, 2009, Dublin, Ireland; [SIGPLAN Notices: A Monthly Publication of the Special Interest Group on Programming Languages of the AS, vol. 47, No. 1, Jan. 25, 2012 (Jan. 25, 2012), pp. 217-230, XP058007080.
A. Voellmy et al: "Don't Configure the Network, Program It! Domain-Specific Programming Languages for Network Systems", Jul. 10, 2010, pp. 1-11, XP002759857, Retrieved from the Internet: URL:http://cs-www.cs.yale.edu/publications /techreports/tr1432.pdf [retrieved on Jul. 12, 2016].
Andrew D Ferguson et al: "Hierarchical policies for software defined networks". Hot Topics in Software Defined Networks. ACM. 2 Penn Plaza. Suite 701 New York NY 10121-0701 USA. Aug. 13, 2012. pp. 37-42. Helsinki, Finland XP058008061.
Stephen Gutz Cornell et al: "Splendid Isolation: A Slice Abstraction for Software-Defined Networks", Jul. 10, 2012. XP055278016. Helsinki, Finland , Retrieved from the Internet: URL:https://www.cs.duke.edu/courses/fall13 /compsci590.4/838-CloudPapers/splendid.pdf [retrieved on Jun. 6, 2016].

\* cited by examiner

METHOD AND EQUIPMENT FOR CONFIGURING A SOFTWARE-DEFINED NETWORK

FIELD OF THE INVENTION

The invention relates generally to a software-defined network "SDN". More particularly, the invention relates to a method and a computer program for configuring one or more network elements of a software-defined network. Furthermore, the invention relates to a network element of a software-defined network.

BACKGROUND

Software defined networking is an emerging architecture for data transfer networks. In a software-defined network "SDN", the control plane is separated from the data plane so that the control plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the software defined networking allows for quick experimenting and optimization of switching and/or routing policies and external access to the innards of network elements that formerly were closed and proprietary.

Internet Protocol "IP" based networks were initially built based on the concept of Autonomous Systems "AS". This concept allows networks to scale and extend by connected junctions that forward packets to a reasonable next hop based on partial need-to-know information. The AS principle works much like the traditional post office service, where a postal worker in a given city does not need to know all the tenants of all the streets in another city in order to choose a reasonable next hop for a letter at hand. This approach to networking is simple, and has proven resilient and scalable. This approach has, however, a few drawbacks. It does not allow the designated destinations, or tenants with home mail-boxes, to move without changing their identity as far as the packet delivery service is concerned. The topological location of destinations, which is the network interface they are attached to, dictates their identity related to the packet delivery service. In addition, using only the basic AS principle, it is hard to specify other qualities, such as logical grouping, access control, quality of service, intermediate network processing, or to specify aspects that relate to a sequence of packets that form a flow.

Using the analogy of the postal service, the software defined networking works, for any given street location, so that all the letters from all the tenants would first be aggregated by a network element on an edge a software-defined network. This network element is configured to examine the current location for each of the letter-destinations using a global lookup mechanism. Based on that global lookup and on other globally defined and globally measured considerations, such as access control or remote location load conditions, the said network element places one or more of the original letters in an additional envelope addressed to each of the street locations where the destinations currently are. It then uses the normal postal service which works like the traditional Internet Protocol "IP" to get these outer envelopes to the remote locations. This is done based on the existing and scalable hop-by-hop forwarding services. The outer letters are then opened by a remote network element and the original envelopes are delivered to the destinations. It is to be noted that the above-presented analogy between the software defined networking and the postal service is a strong simplification and it gives only a limited viewpoint about the versatile possibilities provided by the software defined networking.

The software defined networking is, however, not free from challenges. Some of the challenges are related to configuring the network elements so that they are capable of carrying out desired tasks. In many cases, a protocol according to the OpenFlow specification is used for communicating configuration data from the controller of a software-defined network to the network elements of the software-defined network. The OpenFlow specification is managed by the Open Networking Foundation "ONF". A network element supporting the OpenFlow specification is adapted to maintain one of more look-up tables, i.e. one or more flow tables and a group table, which define actions to be executed when managing, e.g. forwarding or modifying, data frames. The versatility of the actions is dependent on the flexibility of a look-up table structure and on a set of pre-determined actions that can be related to the entries of the look-up tables and are executable in response to a situation in which a relevant portion of a data frame matches the relevant entry. For example, in conjunction with the OpenFlow, the need to add new actions has led to increased complexity of the OpenFlow specification and, as a corollary, to increased complexity of network elements supporting the OpenFlow specification. Therefore, there is still a need for technical solutions for configuring network elements of software-defined networks.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new method for configuring one or more network elements of a software-defined network, where each of the network elements maintains at least one look-up table defining actions to be executed in conjunction with managing a first data frame. A method according to the invention comprises:

receiving, at a network element, one or more second data frames from a controller of the software-defined network, reading, from the one or more second data frames, a configuration program comprising one or more computer executable instructions defining at least one action to be executed in conjunction with managing the first data frame, and associating the configuration program to the at least one look-up table so that the configuration program is callable to be executed in conjunction with managing the first data frame with the aid of the at least one look-up table.

The configuration program can be associated to the one or more look-up tables for example so that one or more of entries of the look-up tables comprise an order to execute the configuration program. For another example, the configuration program can associated to the one or more look-up tables so that a first one of the entries of the look-up tables comprises an order to execute the configuration program with one or more first values of one or more input parameters of the configuration program and a second one of the entries of the look-up tables comprises the order to execute the configuration program with one or more second values of the one or more input parameters of the configuration program. For a third example, the configuration program can be associated to the at least one look-up table so that a look-up table represents an order to execute the configuration program prior to executing a look-up from the look-up table and the output data returned by the configuration program can be used as at least a part of a look-up key determining which one of the entries of the look-up table is the result of the look-up. For a fourth example, the configuration program can be associated to the one or more look-up tables so that a first one of entries of the look-up tables comprises an order to add, to a dynamic action list that is built for managing one or more data frames, an order to execute the configuration program and possibly also input parameters of the configuration program. The use of the configuration program instead of mere configuration parameters increases the flexibility of configuring a software-defined network because functionalities of network elements do not need to be limited in accordance with a pre-determined collection of actions defined by a protocol, e.g. the OpenFlow, for configuring the network elements.

The configuration program can be received at a network element in a form that is not executable by the means for implementing the data plane, e.g. in a form of a human readable source code. In this case, the associating the configuration program to the at least one look-up table comprises compiling the configuration program into a program code executable by the said means for implementing the data plane.

In accordance with the invention, there is provided also a new network element for a software-defined network: A network element according to the invention comprises:
  a data transfer interface for receiving data and for transmitting data,
  a control processor section for maintaining at least one look-up table defining actions to be executed in conjunction with managing a first data frame, and
  a network processor section for managing the first data frame in accordance with the at least one look-up table,
wherein:
  the control processor section is adapted to read, from one or more second data frames, a configuration program comprising one or more computer executable instructions defining at least one action to be executed in conjunction with managing the first data frame,
  the control processor section is adapted to associate the configuration program to the at least one look-up table so that the configuration program is callable to be executed in conjunction with managing the first data frame with the aid of the at least one look-up table, and
  the network processor section is adapted to execute the at least one action defined by the configuration program in response to a situation in which the managing the first data frame includes an order to execute the configuration program.

In accordance with the invention, there is provided also a new software-defined network that comprises one or more network elements according to the invention and a controller for transmitting, to the one or more network elements, one or more data frames containing the above-mentioned configuration program.

In accordance with the invention, there is provided also a new computer program for configuring a network element of a software-defined network, the network element maintaining at least one look-up table defining actions to be executed in conjunction with managing a first data frame. A computer program according to the invention comprises computer executable instructions for controlling a programmable control processor section of the network element to:
  read, from one or more second data frames received from a controller of the software-defined network, a configuration program comprising one or more computer executable instructions defining at least one action to be executed in conjunction with managing the first data frame, and
  associate the configuration program to the at least one look-up table so that the configuration program is callable to be executed in conjunction with managing the first data frame with the aid of the at least one look-up table.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in depending claims are mutually freely combinable unless otherwise explicitly stated.

BRIEF DESCRIPTION OF THE FIGURES

The exemplifying and non-limiting embodiments of the invention and their advantages are explained in greater detail below with reference to the accompanying drawings, in which.

DESCRIPTION OF EXEMPLIFYING EMBODIMENTS

Figure 1:
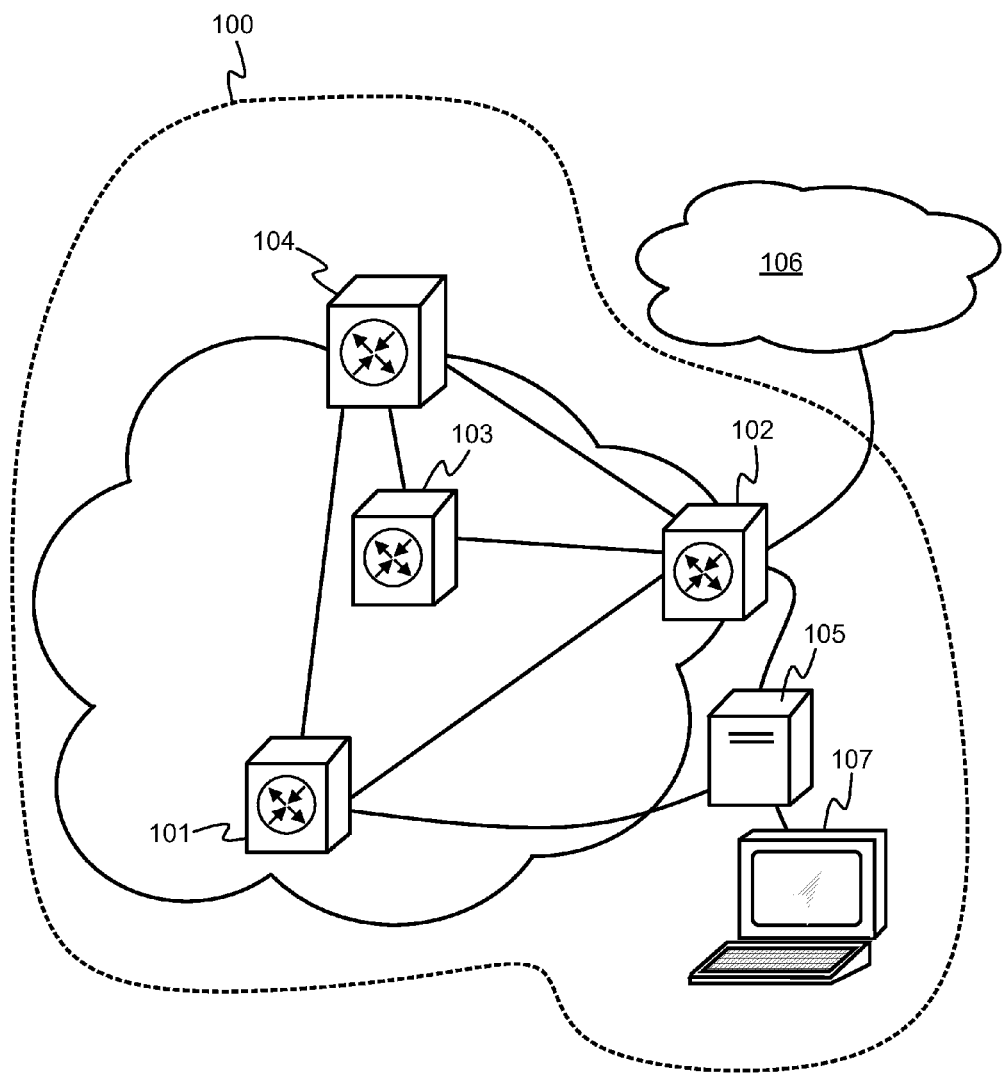
FIG. 1 shows a schematic illustration of a software-defined network according to an exemplifying embodiment of the invention.

FIG. 1 shows a schematic illustration of a software-defined network "SDN" 100 according to an exemplifying embodiment of the invention. The software-defined network comprises network elements 101, 102, 103, and 104 and a controller 105. The network elements 101-104 of this exemplifying software-defined network are mutually interconnected with data transfer links as illustrated in FIG. 1. Furthermore, the exemplifying software-defined network "SDN" 100 may comprise other network elements that are not shown in FIG. 1. The network elements may be e.g. IP (Internet Protocol) routers, multiprotocol label switching "MPLS" nodes, packet optical switches, and/or Ethernet switches. Each network element may consist of a single apparatus or a combination of a plurality of apparatuses. In the exemplifying case illustrated in FIG. 1, a terminal device 107 is connected to the controller 105 and the network element 102 acts as a gateway to an external network 106 that can be e.g. the global Internet. The controller 105 comprises a data transfer interface for receiving data from the terminal device 107 and/or from one or more other devices connected with data transfer links to the data transfer interface of the controller.

Each of the network elements 101-104 comprises a control processor section for maintaining at least one look-up table defining actions to be executed in conjunction with managing data frames, and a network processor section for managing the data frames in accordance with the at least one look-up table. The at least one look-up table may comprise, for example but not necessarily, one or more successive flow tables and a group table according to the OpenFlow specification. In the exemplifying case where the OpenFlow is used, each flow table in a network element contains a set of flow entries. Each flow entry may consist of match fields, counters, and a set of actions to apply to matching data frames. Matching typically starts at the first flow table and may continue to additional flow tables. Flow entries are typically arranged into a priority order and the first matching entry in each table is the one being used. If a matching flow entry is found, the one or more actions associated with this specific flow entry are executed. If no match is found in a flow table, the data frame may be forwarded to the controller 105 over an OpenFlow channel between the network element under consideration and the controller 105, the data frame may be dropped, or the data frame may continue to the next flow table or to the group table. Actions associated with each flow entry may comprise for example data frame forwarding, data frame modification, group table processing, and pipeline processing. Pipeline processing actions allow data frames to be sent to subsequent flow tables for further processing and allow information, in the form of metadata, to be communicated between the flow tables. Table pipeline processing stops when the one or more actions associated with a matching flow entry does not specify a next table. At this point the data frame under consideration is usually modified and forwarded. The group table processing actions allow data frames to be sent to the group table for further processing and allow information, in the form of metadata, to be communicated to the group table. The group table contains group entries, where each group entry may contain a list of actions to be directed data frames defined to belong to a particular group.

The controller 105 is configured to send to each of the network elements 101-104 configuration data that comprises one or more configuration programs each of which comprising one or more computer executable instructions defining an action or a chain of actions to be executed in conjunction with managing data frames in the network element under consideration. Furthermore, in addition to the above-mentioned one or more configuration programs, the configuration data may comprise data items for configuring the network element in accordance with a pre-determined collection of actions defined by a protocol, e.g. the OpenFlow, for configuring the network elements The control processor section of each of the network elements 101-104 is adapted to associate each configuration program to the one or more look-up tables so that the configuration program is callable to be executed in conjunction with managing the first data frame with the aid of the at least one look-up table. The network processor section of each of the network elements 101-104 is adapted to execute the at least one action defined by the configuration program in response to a situation in which the managing a particular data frame includes an order to execute the configuration program. An action or a chain of actions defined by the configuration program may comprise for example: reading data from a data frame, modifying the data frame, selecting one or more of egress ports of the network element and forwarding the data frame and its possible duplicates to the selected one or more egress ports, selecting one of look-up tables maintained by the network element and executing a look-up from the selected look-up table, performing arithmetic operations, branching operations, performing logical operations, reading metadata associated with the data frame, writing metadata associated with the data frame, modifying metadata associated with the data frame, dropping the data frame, and/or duplicating the data frame. The use of the configuration program instead of mere configuration parameters increases the flexibility of configuring the software-defined network 100 because functionalities of network elements 101-104 do not need to be limited in accordance with a pre-determined collection of actions defined by a protocol, e.g. the OpenFlow, for configuring the network elements.

In a software-defined network "SDN" according to an exemplifying embodiment of the invention, the configuration program can be delivered from the controller 105 to the network element under consideration in a form that is not executable by the network processor section of the network element. The configuration program can be delivered e.g. in a form of a human readable source code. In this case, the control processor section is advantageously adapted to compile the configuration program into a program code, i.e. an object code, executable by the network processor section. In the exemplifying software-defined network "SDN", two or more of the network elements 101-104 may have mutually different network processing sections. In this case, these network elements may use different compilers for compiling a configuration program received from the controller 105. Thus, the configuration program can be sent in the same form to all of the network elements 101-104, but each network element is advantageously provided with appropriate compiler means for converting the configuration program into a form executable by the network processor section of the network element under consideration.

Figure 2:
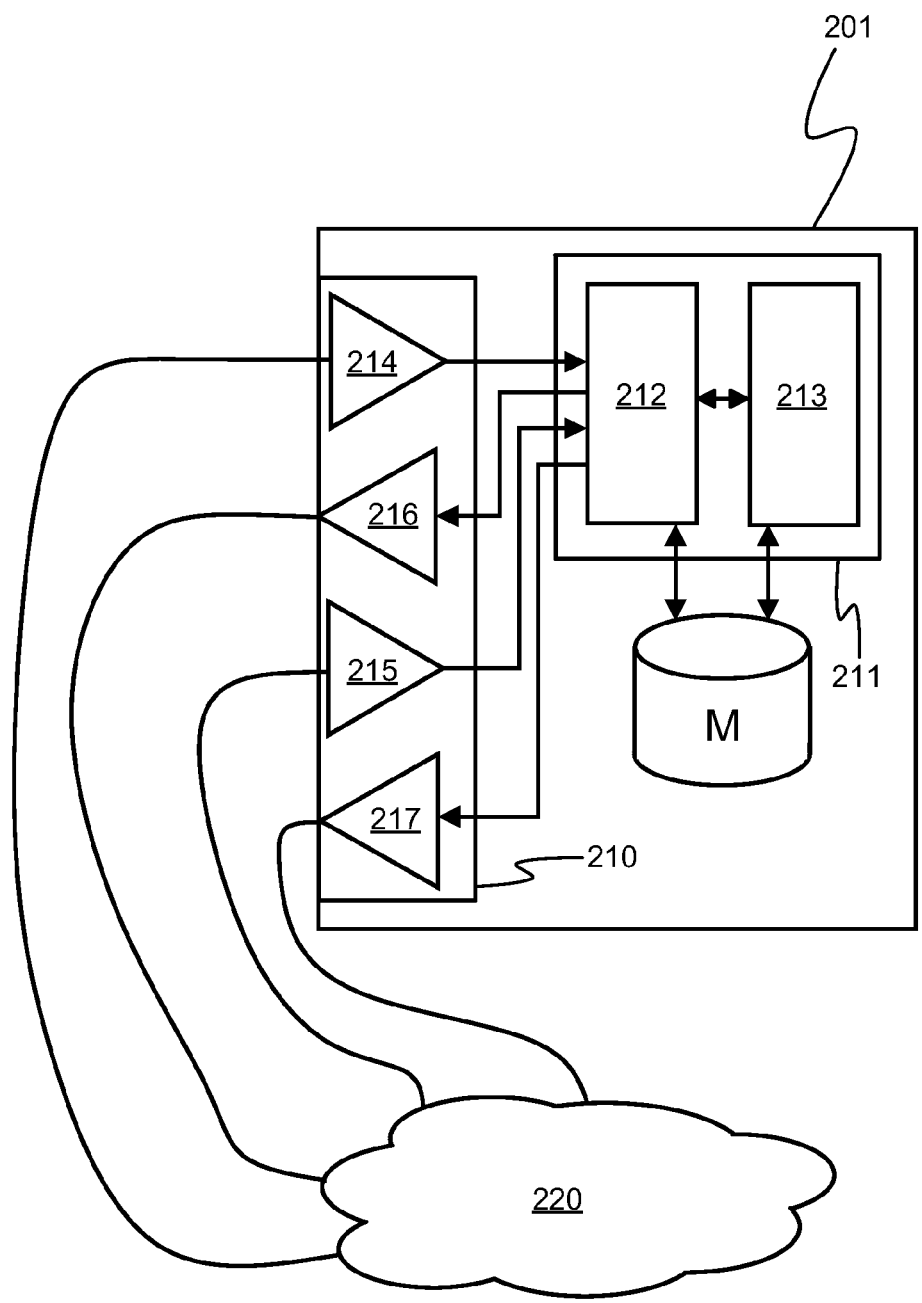
FIG. 2 shows a schematic illustration of a network element according to an exemplifying embodiment of the invention.

FIG. 2 shows a schematic illustration of a network element 201 according to an exemplifying embodiment of the invention. The network element can be, for example, an Internet Protocol "IP" router, a Multiprotocol label switching "MPLS" switch, a packet optical switch, and/or an Ethernet switch The network element comprises a data transfer interface 210 for receiving data and for transmitting data. The data transfer interface 210 comprises ingress ports 214 and 215 and egress ports 216 and 217 for connecting via data transfer links to a data transfer network 220. The network element 201 comprises a processing system 211 that comprises control processor section 213 and a network processor section 212. The control processor section 213 is adapted to maintain at least one look-up table defining actions to be executed in conjunction with managing a first data frame, and the network processor section 212 is adapted to manage the first data frame in accordance with the at least one look-up table. The control processor section 213 is adapted to read, from one or more second data frames, a configuration program comprising one or more computer executable instructions defining at least one action to be executed in conjunction with managing the first data frame. The control processor section 213 is adapted to associate the configuration program to the at least one look-up table so that the configuration program is callable to be executed in conjunction with managing the first data frame with the aid of the at least one look-up table. The network processor section 212 is adapted to execute the at least one action defined by the configuration program in response to a situation in which the managing the first data frame includes an order to execute the configuration program. The one or more actions defined by the configuration program may comprise, for example, one or more of the following: reading data from the first data frame, modifying the first data frame, selecting one of the egress ports of the data transfer interface 210 and forwarding the first data frame to the selected egress port, selecting one of look-up tables maintained by the network element and executing a look-up from the selected look-up table, performing arithmetic operations, branching operations, performing logical operations, reading metadata associated with the first data frame, writing metadata associated with the first data frame, modifying metadata associated with the first data frame, dropping the first data frame, duplicating the first data frame.

In a network element according to an exemplifying embodiment of the invention, the control processor section 213 is adapted to compile the configuration program into a program code executable by the network processor section 212.

In a network element according to an exemplifying embodiment of the invention, the control processor section 213 is adapted to associate the configuration program to the at least one look-up table so that at least one of entries of the look-up table comprises the order to execute the configuration program.

In a network element according to an exemplifying embodiment of the invention, the control processor section 213 is adapted to associate the configuration program to the at least one look-up table so that a first one of entries of the look-up table comprises the order to execute the configuration program with one or more first values of one or more input parameters of the configuration program and a second one of the entries of the look-up table comprises the order to execute the configuration program with one or more second values of the one or more input parameters of the configuration program.

In a network element according to an exemplifying embodiment of the invention, the control processor section 213 is adapted to associate the configuration program to the at least one look-up table so that the look-up table represents the order to execute the configuration program prior to executing a look-up from the look-up table, i.e. sending a data frame and/or its associated metadata or pointer to the look-up table causes running the configuration program as a pre-operation prior to the look-up. The network processor section 212 can be adapted to use the output data returned by the configuration program as at least a part of a look-up key for the look-up from the look-up table, where the look-up key determines which one of the entries of the look-up table is the result of the look-up. When the output data returned by the configuration program represents only a part of the look-up key, the other part of the look-up key can be e.g. a key defined with a known protocol, e.g. the OpenFlow, for configuring network elements.

In a network element according to an exemplifying embodiment of the invention, the network processor section 212 is adapted to build an action list for managing the first data frame and subsequently execute actions listed on the action list. In this case, at least part of look-ups related to managing one or more data frames can be made first and at least part of actions determined by the said loop-ups can be executed after the said look-ups. It is, however, possible that some of the actions include look-ups whose result, in turn, dictate further actions. The control processor section 213 is adapted to associate the configuration program to the at least one look-up table so that a first one of entries of the look-up table comprises an order to add, to the above-mentioned action list, an order to execute the configuration program. The control processor section can be adapted to associate the configuration program to the at least one look-up table so that so that the first one of the entries of the look-up table further comprises an order to add, to the action list, one or more first values of one or more input parameters of the configuration program. Another entity of this look-up table or an entity of another look-up table may comprise an order to add, to the action list, an order to execute the configuration program with one or more second values of the one or more input parameters of the configuration program.

The processing system 211 of the network element shown in FIG. 2 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
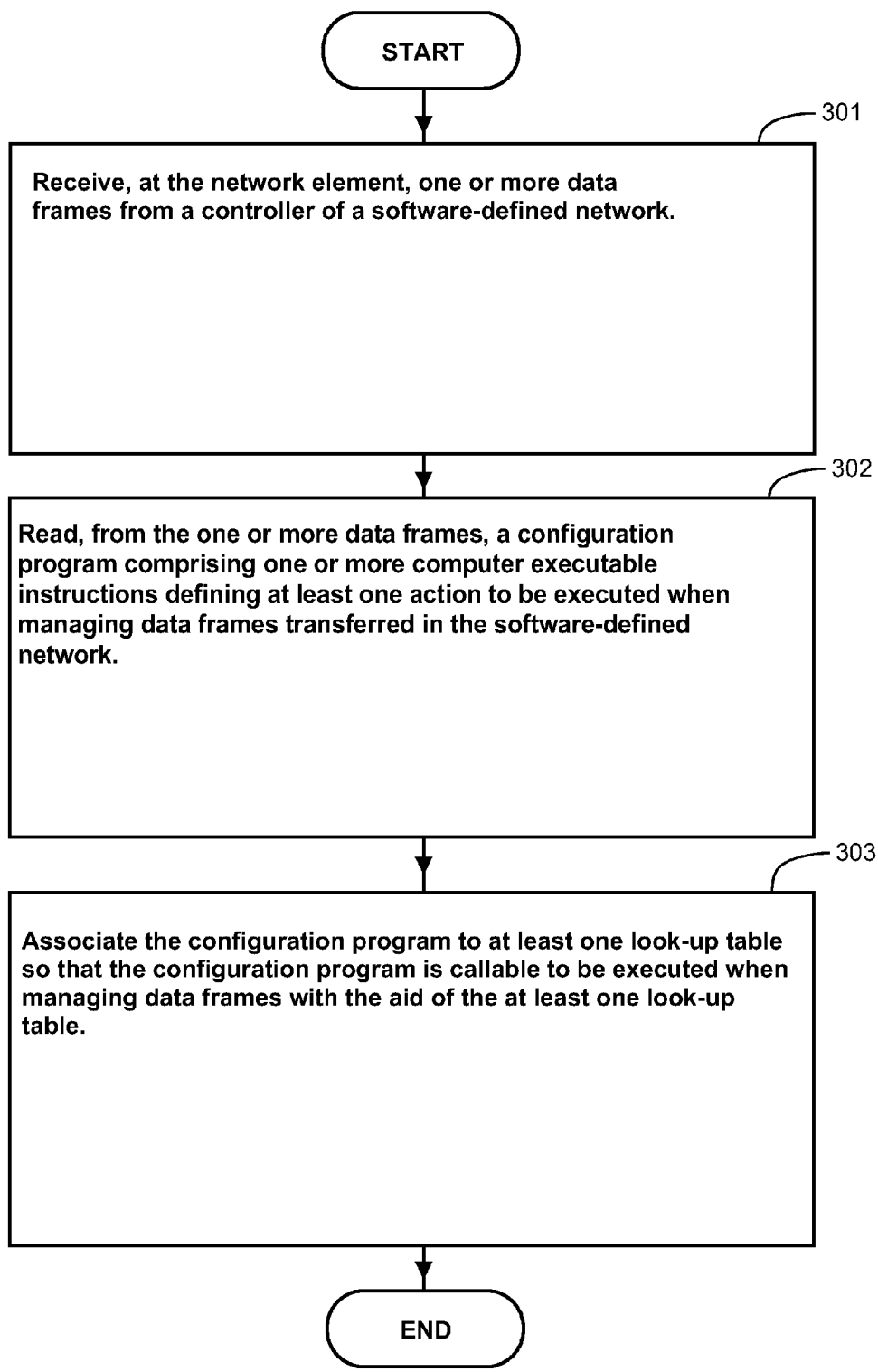
FIG. 3 shows a flow chart of a method according to an exemplifying embodiment of the invention for configuring a network element of a software-defined network.

FIG. 3 shows a flow chart of a method according to an exemplifying embodiment of the invention for configuring a network element of a software-defined network, the network element maintaining at least one look-up table defining actions to be executed in conjunction with managing a first data frame. The method comprises the following actions:
- action 301: receiving, at the network element, one or more second data frames from a controller of the software-defined network,
- action 302: reading, from the one or more second data frames, a configuration program comprising one or more computer executable instructions defining at least one action to be executed in conjunction with managing the first data frame, and
- action 303: associating the configuration program to the at least one look-up table so that the configuration program is callable to be executed in conjunction with managing the first data frame with the aid of the at least one look-up table.

The one or more actions defined by the configuration program may comprise, for example, one or more of the following: reading data from the first data frame, modifying the first data frame, selecting one of the egress ports of the network element and forwarding the first data frame to the selected egress port, selecting one of look-up tables maintained by the network element and executing a look-up from the selected look-up table, performing arithmetic operations, branching operations, performing logical operations, reading metadata associated with the first data frame, writing metadata associated with the first data frame, modifying metadata associated with the first data frame, dropping the first data frame, duplicating the first data frame.

In a method according to an exemplifying embodiment of the invention, the associating the configuration program to the at least one look-up table comprises compiling the configuration program into a program code executable by the network processor section.

In a method according to an exemplifying embodiment of the invention, the configuration program is associated to the at least one look-up table so that at least one of the entries of the look-up table comprises an order to execute the configuration program.

In a method according to an exemplifying embodiment of the invention, the configuration program is associated to the at least one look-up table so that a first one of the entries of the look-up table comprises an order to execute the configuration program with one or more first values of one or more input parameters of the configuration program and a second one of the entries of the look-up table comprises the order to execute the configuration program with one or more second values of the one or more input parameters of the configuration program.

In a method according to an exemplifying embodiment of the invention, the configuration program is associated to the at least one look-up table so that the look-up table represents an order to execute the configuration program prior to executing a look-up from the look-up table.

In a method according to an exemplifying embodiment of the invention, the configuration program is associated to the at least one look-up table so that output data returned by the configuration program is usable as at least a part of a look-up key for the look-up from the look-up table, the look-up key determining which one of the entries of the look-up table is the result of the look-up.

In a method according to an exemplifying embodiment of the invention, the configuration program is associated to the at least one look-up table so that a first one of the entries of the look-up table comprises an order to add, to an action list that is built for managing the first data frame, an order to execute the configuration program.

In a method according to an exemplifying embodiment of the invention, the configuration program is associated to the at least one look-up table so that so that the first one of the entries of the look-up table further comprises an order to add, to the action list, one or more first values of one or more input parameters of the configuration program. Another entity of this look-up table or an entity of another look-up table may comprise an order to add, to the action list, an order to execute the configuration program with one or more second values of the one or more input A computer program according to an exemplifying embodiment of the invention for configuring a network element of a software-defined network comprises computer executable instructions for controlling a programmable processor to carry out a method according to any of the above-described exemplifying embodiments of the invention.

A computer program according to an exemplifying embodiment of the invention comprises software modules for configuring a network element of a software-defined network, the network element maintaining at least one look-up table defining actions to be executed in conjunction with managing a first data frame. The software modules comprise computer executable instructions for controlling a programmable control processor section of the network element to:

read, from one or more second data frames received from a controller of the software-defined network, a configuration program comprising one or more computer executable instructions defining at least one action to be executed in conjunction with managing the first data frame, and associate the configuration program to the at least one look-up table so that the configuration program is callable to be executed in conjunction with managing the first data frame with the aid of the at least one look-up table.

In a computer program according to an exemplifying embodiment of the invention, the software modules comprise computer executable instructions for controlling the programmable control processor section of the network element to compile the configuration program into a program code executable by means of the network element for implementing the data plane of the software-defined network.

The software modules can be e.g. subroutines or functions implemented with a suitable programming language and with a compiler suitable for the programming language and the programmable processor.

A computer program product according to an exemplifying embodiment of the invention comprises a computer readable medium, e.g. a compact disc ("CD"), encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A network element for a software-defined network, the network element comprising:

a data transfer interface that receives and transmits data frames;

a control processor section that maintains at least one look-up table having first actions stored therein that are executed in conjunction with steps carried out for managing a first data frame; and a network processor section that, upon receiving the first data frame, manages the first data frame in accordance with a corresponding entry in the at least one look-up table, wherein:

the control processor section, upon receiving one or more second data frames different from the first data frame, and upon distinguishing said one or more second data frames from said first data frame, reads from said one or more second data frames a configuration program comprising one or more computer executable instructions, the one or more computer executable instructions defining at least one second action to be executed in conjunction with the managing of the first data frame, the one or more computer executable instructions being different from the first actions stored in the at least one look-up table, the control processor section storing the configuration program separate from the at least one look-up table, and updating the at least one look-up table to include an order to execute the stored configuration program in a manner such that the stored configuration program is associated with the first data frame; and the network processor section, responsive to a situation in which the managing of a received first data frame includes a match in the updated look-up table containing the order to execute the stored configuration program, executes the at least one second action defined by the configuration program.

2. The network element according to claim 1, wherein the control processor section compiles the configuration program into a program code executable by the network processor section.

3. The network element according to claim 1, wherein the control processor section associates the configuration program to the at least one look-up table so that at least one of entries of the look-up table comprises the order to execute the configuration program.

4. The network element according to claim 1, wherein the control processor section associates the configuration program to the at least one look-up table so that a first one of entries of the look-up table comprises the order to execute the configuration program with one or more first values of one or more input parameters of the configuration program and a second one of the entries of the look-up table comprises the order to execute the configuration program with one or more second values of the one or more input parameters of the configuration program.

5. The network element according to claim 1, wherein the control processor section associates the configuration program to the at least one look-up table so that the look-up table represents the order to execute the configuration program prior to executing a look-up from the look-up table.

6. The network element according to claim 5, wherein the network processor section uses output data returned by the configuration program as at least a part of a look-up key for the look-up from the look-up table, the look-up key determining which one of entries of the look-up table is a result of the look-up.

7. The network element according to claim 1, wherein the network processor section builds an action list for managing the first data frame and subsequently execute actions listed on the action list, and the control processor section associates the configuration program to the at least one look-up table so that a first one of entries of the look-up table comprises an order to add, to the action list, an order to execute the configuration program.

8. The network element according to claim 7, wherein the control processor section associates the configuration program to the at least one look-up table so that so that the first one of the entries of the look-up table further comprises an order to add, to the action list, one or more first values of one or more input parameters of the configuration program.

9. The network element according to claim 1, wherein the at least one second action defined by the configuration program comprises instructions for at least one of the following:
    reading data from the first data frame, modifying the first data frame,
    selecting one of the egress ports of the data transfer interface and forwarding the first data frame to the selected egress port,
    selecting one of look-up tables maintained by the network element and executing a look-up from the selected look-up table,
    performing arithmetic operations, branching operations, performing logical operations, reading metadata associated with the first data frame,
    writing metadata associated with the first data frame,
    modifying metadata associated with the first data frame,
    dropping the first data frame, and
    duplicating the first data frame.

10. The network element according to claim 1, wherein the network element is at least one of the following:
    an Internet Protocol "IP" router, a Multiprotocol label switching "MPLS" switch, an Ethernet switch, and
    a packet optical switch.

11. A method for configuring a network element of a software-defined network, the network element maintaining at least one look-up table having first actions stored therein that are executed in conjunction with managing a first data frame, the method comprising:
    receiving, at the network element, one or more second data frames from a controller of the software-defined network, and determining that said one or more second data frames are different from said first data frame;
    upon determining said one or more second data frames, reading and storing, at the network element, from the one or more second data frames, a configuration program comprising one or more computer executable instructions defining at least one second action to be executed in conjunction with the managing of the first data frame, the one or more computer executable instructions being different from the first actions stored in the at least one look-up table,
    the control processor section storing the configuration program separate from the at least one look-up table; and
    updating the at least one look-up table to include an order to execute the stored configuration program in a manner such that the configuration program is associated with the first data frame; and
    configuring the network element to, responsive to receiving a received first data frame, query the at least one look-up table and, upon a match the updated look-up table containing the order to execute the configuration program, executing the at least one second action defined by the configuration program.

12. The method according to claim 11, further comprising:
    in updating the at least one look-up table to associate the configuration program to the at least one look-up table, compiling the configuration program into a program code executable by the network processor section.

13. The method according to claim 11, wherein the configuration program is associated to the at least one look-up table so that a first one of entries of the look-up table comprises the order to execute the configuration program with one or more first values of one or more input parameters of the configuration program, and a second one of the entries of the look-up table comprises the order to execute the configuration program with one or more second values of the one or more input parameters of the configuration program.

14. The method according to claim 11, wherein the configuration program is associated to the at least one look-up table so that the look-up table represents an order to execute the configuration program prior to executing a look-up from the look-up table.

15. The method according to claim 14, wherein the configuration program is associated to the at least one look-up table so that output data returned by the configuration program is usable as at least a part of a look-up key for the look-up from the look-up table, the look-up key determining which one of entries of the look-up table is a result of the look-up.

16. The method according to claim 11, wherein the configuration program is associated to the at least one look-up table so that a first one of entries of the look-up table comprises an order to add, to an action list that is built for managing the first data frame, an order to execute the configuration program.

17. The method according to claim 16, wherein, the configuration program is associated to the at least one look-up table so that so that the first one of the entries of the look-up table further comprises an order to add, to the action list, one or more first values of one or more input parameters of the configuration program.

18. The method according to claim 11, wherein the at least one action defined by the configuration program comprises at least one of the following:
reading data from the first data frame, modifying the first data frame, selecting one of the egress ports of the network element and forwarding the first data frame to the selected egress port, selecting one of look-up tables maintained by the network element and executing a look-up from the selected look-up table, performing arithmetic operations, branching operations, performing logical operations, reading metadata associated with the first data frame, writing metadata associated with the first data frame, modifying metadata associated with the first data frame, dropping the first data frame, duplicating the first data frame.

19. A software-defined network, comprising:
one or more network elements, each of which comprising
  a data transfer interface for receiving data and for transmitting data,
  a control processor section that maintains at least one look-up table having information stored therein defining first actions that are executed in conjunction with managing a first data frame,
  a network processor section that manages the first data frame in accordance with a corresponding entry in the at least one look-up table, and
  a controller that transmits, to one or more other of the one or more network elements, one or more second data frames, different from said first data frame, said one or more second data frames containing a configuration program comprising one or more computer executable instructions defining at least one second action to be executed by the one or more network elements in conjunction with managing the first data frame,
wherein:
the control processor section of each of the network elements, upon receipt of the one of more second data frames, reads, from the received one or more second data frames, the configuration program and stores the configuration program in a memory separate from the at least one look-up table, and updates the at least one look-up table to include an order to execute the at least one second action of the stored configuration program in a manner such that the stored configuration program is associated with the first data frame by way of the at least one look-up table, and
the network processor section of each of the network elements, responsive to a situation in which the managing of a received first data frame includes a match in the updated look-up table containing the order to execute the configuration program, executes the stored at least one second action defined by the configuration program in accordance with the update to the at least one look-up table.

20. A non-transitory computer readable medium encoded with a computer program for configuring a network element of a software-defined network, the network element maintaining at least one look-up table defining first actions to be executed in conjunction with managing a first data frame, the computer program comprising computer executable instructions for controlling a programmable control processor section of the network element to:
read, from one or more second data frames, received from a controller of the software-defined network and distinguishable from the first data frame, a configuration program comprising one or more computer executable instructions defining at least one second action to be executed in conjunction with managing the first data frame, the one or more computer executable instructions being different from the first actions stored in the at least one look-up table;
store the received configuration program in a memory separate from the at least one look-up table;
update the at least one look-up table to include an order to execute the at least one second action of the stored configuration program in a manner such that the stored configuration program is associated with the first data frame with the aid of the at least one look-up table; and
responsive to a situation in which the managing of a received first data frame includes a match in the updated look-up table containing the order to execute the configuration program, execute the stored at least one second action defined by the configuration program in accordance with the update to the at least one look-up table.

* * * * *